United States Patent
Pande et al.

(10) Patent No.: US 9,641,219 B2
(45) Date of Patent: May 2, 2017

(54) SUB-BAND POWER SCALING REPORTING AND SUB-BAND TRANSMIT POWER ESTIMATION

(71) Applicant: Texas Instruments Incorporated, Dallas, TX (US)

(72) Inventors: Tarkesh Pande, Richardson, TX (US); Anand Dabak, Plano, TX (US); Kumaran Vijayasankar, Allen, TX (US); Ramanuja Vedantham, Allen, TX (US); Il Han Kim, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/886,961

(22) Filed: Oct. 19, 2015

(65) Prior Publication Data
US 2016/0043773 A1    Feb. 11, 2016

Related U.S. Application Data

(63) Continuation of application No. 13/656,694, filed on Oct. 20, 2012, now abandoned.
(Continued)

(51) Int. Cl.
*H04L 27/18*    (2006.01)
*H04L 27/32*    (2006.01)
(Continued)

(52) U.S. Cl.
CPC ............. *H04B 3/54* (2013.01); *H04L 5/0094* (2013.01); *H04L 27/04* (2013.01);
(Continued)

(58) Field of Classification Search
CPC .......... H04B 1/10; H04B 1/1081; H04B 3/54; H04B 3/542; H04B 3/544; H04B 15/00;
(Continued)

(56) References Cited

U.S. PATENT DOCUMENTS 6,288,632 B1 *  9/2001  Hoctor ..................... H04B 3/54
                                                340/12.33
7,269,403 B1 *  9/2007  Miao ....................... H04B 3/542
                                                 455/11.1
(Continued)

FOREIGN PATENT DOCUMENTS

WO    WO 2010012313 A1 *  2/2010  ......... H04L 27/2613

OTHER PUBLICATIONS

IEEE PI 901.2/DO.08.00, Draft Standard for Low Frequency (less than 500 kHz) Narrow Band Power Line Communications for Smart Grid Applications, IEEE, May 2013, p. 1-100.*

*Primary Examiner* — Benjamin H Elliott, IV
*Assistant Examiner* — Eric Nowlin
(74) *Attorney, Agent, or Firm* — Ronald O. Neerings; Charles A. Brill; Frank D. Cimino

(57) ABSTRACT

Systems and methods for routing protocols for power line communications (PLC) are described. In some embodiments, a method performed by a PLC device, such as a PLC meter, may include selecting one or more transmit sub-bands on which to transmit frames, where the transmit sub-bands comprise groups of carrier frequencies. The PLC device then generates a frame comprising a tone map that indicates which transmit sub-bands are used to carry data for the frame. The tone map using two bits per transmit sub-band to indicate a status of each transmit sub-band. The PLC device then transmits the frame on the selected transmit sub-bands. A resolution bit and a mode bit may be used to provide additional information about the transmit sub-bands, such as an amount of power adjustment that has been applied to carrier frequencies and whether dummy bits are transmitted on unused carrier frequencies.

30 Claims, 6 Drawing Sheets

Related U.S. Application Data

(60) Provisional application No. 61/550,145, filed on Oct. 21, 2011, provisional application No. 61/562,032, filed on Nov. 21, 2011, provisional application No. 61/581,334, filed on Dec. 29, 2011.

(51) Int. Cl.
*H04B 3/54* (2006.01)
*H04L 27/04* (2006.01)
*H04L 5/00* (2006.01)
*H04L 27/26* (2006.01)

(52) U.S. Cl.
CPC .. *H04L 27/2602* (2013.01); *H04B 2203/5416* (2013.01); *H04L 27/18* (2013.01); *H04L 27/32* (2013.01)

(58) Field of Classification Search
CPC .... H04B 2203/5408; H04B 2203/5416; H04L 1/0009; H04L 5/0046; H04L 5/0094; H04L 25/03834; H04L 27/04; H04L 27/18; H04L 27/2602; H04L 27/32
See application file for complete search history.

(56) References Cited

U.S. PATENT DOCUMENTS

| | | | | |
|---|---|---|---|---|
| 8,270,505 B2* | 9/2012 | Stadelmeier | ........... | H04B 3/542 375/147 |
| 8,320,233 B2* | 11/2012 | Razazian | ................. | H04B 3/54 370/208 |
| 8,659,181 B2* | 2/2014 | Choi | ..................... | H04B 3/548 307/1 |
| 8,750,394 B2* | 6/2014 | Abad Molina | ........ | H04B 3/542 340/12.32 |
| 8,750,446 B2* | 6/2014 | Mollfulleda San Julian | ................. | H04L 27/2613 375/365 |
| 2004/0164688 A1* | 8/2004 | Van Tichelen | ........... | H04B 3/54 315/292 |
| 2004/0261101 A1* | 12/2004 | Iwamura | ................. | H04B 3/542 725/32 |
| 2006/0097574 A1* | 5/2006 | Gidge | ...................... | H04B 3/58 307/3 |
| 2010/0254433 A1* | 10/2010 | Azizi | .................... | H04L 5/0007 375/141 |
| 2010/0272192 A1* | 10/2010 | Varadarajan | ........ | H04L 27/2613 375/257 |
| 2010/0316140 A1* | 12/2010 | Razazian | ................. | H04B 3/54 375/257 |
| 2010/0321168 A1* | 12/2010 | Sugawara | .............. | H04B 3/542 340/538 |
| 2011/0164670 A1* | 7/2011 | Abad Molina | ........ | H04L 5/0046 375/227 |
| 2011/0255557 A1* | 10/2011 | Varadarajan | ............. | H04B 1/69 370/474 |
| 2011/0317723 A1* | 12/2011 | Abad Molina | ........ | H04B 3/542 370/475 |
| 2013/0044828 A1* | 2/2013 | Jiang | ...................... | H04B 3/542 375/257 |
| 2013/0089124 A1* | 4/2013 | Kim | ......................... | H04B 1/38 375/222 |
| 2013/0101055 A1* | 4/2013 | Pande | ..................... | H04B 3/54 375/257 |
| 2016/0043773 A1* | 2/2016 | Pande | ..................... | H04B 3/54 375/257 |

* cited by examiner

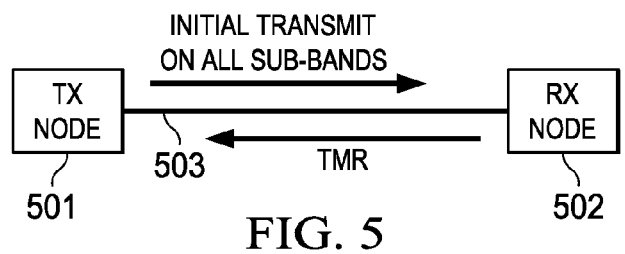
FIG. 5
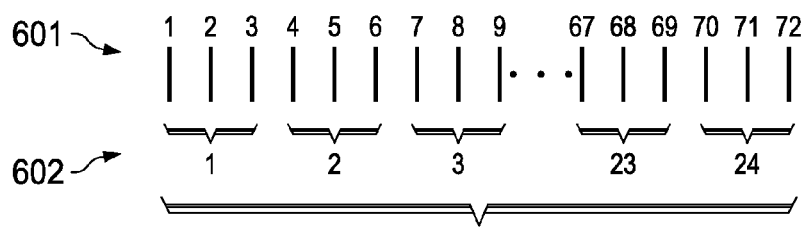
FIG. 6
FIG. 7
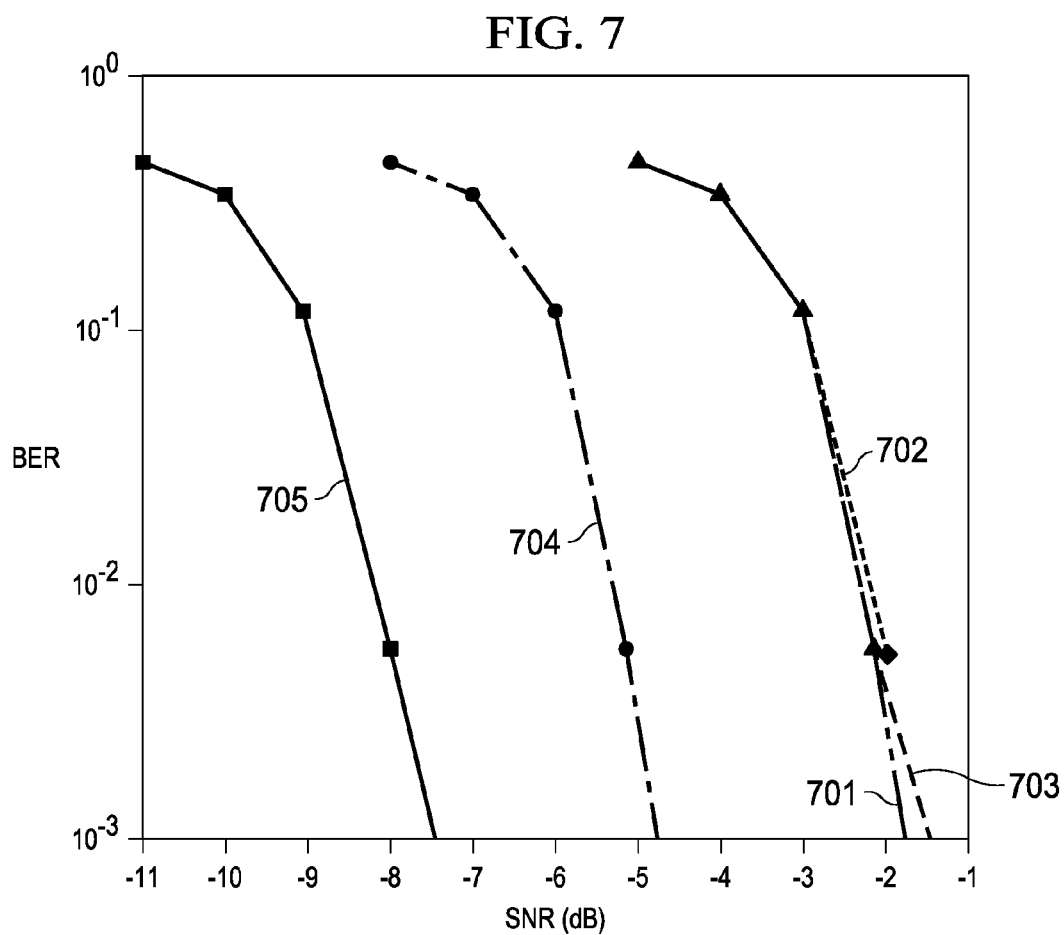

SUB-BAND POWER SCALING REPORTING AND SUB-BAND TRANSMIT POWER ESTIMATION

CROSS-REFERENCE TO RELATED APPLICATION(S)

This application is a Continuation of and claims priority to U.S. patent application Ser. No. 13/656,694 filed Oct. 20, 2012, which claims the benefit of the filing date of U.S. Provisional Patent Application No. 61/550,145, which is titled "TXCOEF and TM Fields for Low Frequency Narrow Band Power Line Communications for Smart Grid Applications" and was filed on Oct. 21, 2011; U.S. Provisional Patent Application No. 61/562,032, which is titled "Sub-Band Transmit Power Estimation Using Preamble" and was filed on Nov. 21, 2011; and U.S. Provisional Patent Application No. 61/581,334, which is titled "TXCOEF and TM Fields for Low Frequency Narrow Band Power Line Communications for Smart Grid Applications" and was filed on Dec. 29, 2011, the disclosures of which are hereby incorporated by reference herein in their entirety.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking PLC applications include utility meters, home area networks, lighting, and solar.

Using PLC to communicate with utility meters enables applications such as Automated Meter Reading (AMR) and Automated Meter Infrastructure (AMI) communications without the need to install additional wires. Consumers may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

PLC may also serve as an important enabling technology for the mass deployment of solar equipment by providing a communication channel to solar inverters for monitoring and managing power across the grid by utility companies. While radio frequency (RF) communications have made some progress in solar installations, PLC offers an ideal means for connecting equipment with high reliability and at a low cost on DC or AC lines.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC defines a single wide band from 10 to 535 kHz; however, PLC systems typically operate at 154-487.5 kHz using seventy-two tones spaced at 4.6875 kHz apart. In other parts of the world different frequency bands are used, such as the Association of Radio Industries and Businesses (ARIB)-defined band in Japan, which operates at 10-450 kHz, and the Electric Power Research Institute (EPRI)-defined bands in China, which operates at 3-90 kHz.

SUMMARY

Systems and methods for implementing sub-band power control and estimation in power line communications (PLC) are described. In an illustrative embodiment, a method performed by a PLC device, such as a PLC meter or data concentrator may include selecting one or more transmit sub-bands on which to transmit frames. The transmit sub-bands may comprise groups of six carrier frequencies, for example. The PLC device generates a frame comprising a frame control header (FCH) that indicates which transmit sub-bands are used to carry data for the frame. The frame control header uses two bits per transmit sub-band to indicate a status of each transmit sub-band. The PLC device then transmits the frame on the selected transmit sub-bands using Orthogonal Frequency-Division Multiplexing (OFDM).

A resolution bit and a mode bit may be used to further define the two-bits per sub-band. The resolution bit indicates an amount of power adjustment that has been applied to carrier frequencies in the transmit sub-bands. The mode bit indicates whether dummy bits are transmitted on carrier frequencies in the transmit sub-bands that do not carry data. In one embodiment using a G3-FCC band, the number of carrier frequencies is seventy-two, there are twelve transmit sub-bands, and the tone map comprises twenty-four bits. The two bits per transmit sub-band, the resolution bit, and the mode bit may be grouped within a frame control header segment of the frame.

The PLC device may set the two bits per transmit sub-band to indicate that a transmit sub-band has been used to carry data and that the power in the transmit sub-band has been adjusted. Alternatively, the two bits per transmit sub-band may indicate that a transmit sub-band has been used to carry data and that the power in the transmit sub-band has not been adjusted. In other embodiments, the two bits per transmit sub-band indicate that a transmit sub-band has not been used to carry data.

The PLC device may receive a tone response map from another device. The tone map response (TMR) may include status recommendations for receive sub-bands. Each transmit sub-band may correspond to two consecutive receive sub-bands. For example, receive sub-bands specified in a tone response message may include three carrier frequencies, but sub-bands in the transmit sub-band may include six carrier frequencies. The frame transmission on the transmit sub-bands may be configured based upon the status recommendations in the tone map.

If a status recommendation in a tone map response for either receive sub-band indicates that the receive sub-band should not be used, then the frame transmission is configured to not use the corresponding transmit sub-band. If a status recommendation for either receive sub-band indicates that a power level for transmissions in the receive sub-band should be boosted, then the frame transmission is configured to boost a power level in a corresponding transmit sub-band. If a status recommendation for a first receive sub-band indicates that a power level for transmissions in the first receive sub-band should be decreased and a status recommendation for a second receive sub-band indicates that a power level for transmissions in the second receive sub-band should be maintained, then the frame transmission is configured to maintain a power level in a corresponding transmit sub-band.

In one embodiment, a frame control header table comprising a tone map that uses two bits per transmit sub-band to indicate a status of each transmit sub-band is used only when coherent modulation is used for transmitting the frame. Otherwise, the PLC device uses a frame control header table comprising a tone map that uses one bit per transmit sub-band.

In other embodiments, a frame control header table comprising a tone map that uses two bits per transmit sub-band to indicate a status of each transmit sub-band is used only when coherent 16 QAM modulation is used for transmitting the frame. Otherwise, the PLC device uses a frame control header table comprising a tone map that uses one bit per transmit sub-band.

A power line communication (PLC) device that is adapted to transmit frames to other devices using OFDM on multiple carrier frequencies may generate a frame comprising a preamble, a first synchronization symbol, a second synchronization symbol, and a data payload. The PLC device may scale a power level for one or more of the preamble, the first synchronization symbol, and the second synchronization symbol using a power adjustment applied to the data payload. The PLC device then transmits the frame using OFDM.

A receiving PLC device may receive the frame comprising a preamble, a first synchronization symbol, a second synchronization symbol, and a data payload The power level for one or more of the preamble, the first synchronization symbol, and the second synchronization symbol may have been scaled a using a power adjustment. The receiving PLC device may estimate a power level adjustment by comparing power levels in one or more of the preamble, the first synchronization symbol, and the second synchronization symbol.

If the power levels of the first synchronization symbol and the second synchronization symbol have been scaled, then the power level adjustment is estimated by comparing power levels in the preamble to power levels in the first synchronization symbol and the second synchronization symbol.

If the power level of the first synchronization symbol or the second synchronization symbol have been scaled, then the power level adjustment is estimated by comparing power levels in the first synchronization symbol to power levels in the second synchronization symbol.

If the power level of the preamble has been scaled but not the power levels of the first synchronization symbol and the second synchronization symbol, then the power level adjustment is estimated by comparing power levels in the preamble to power levels in the first synchronization symbol and the second synchronization symbol.

In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Figure 1:
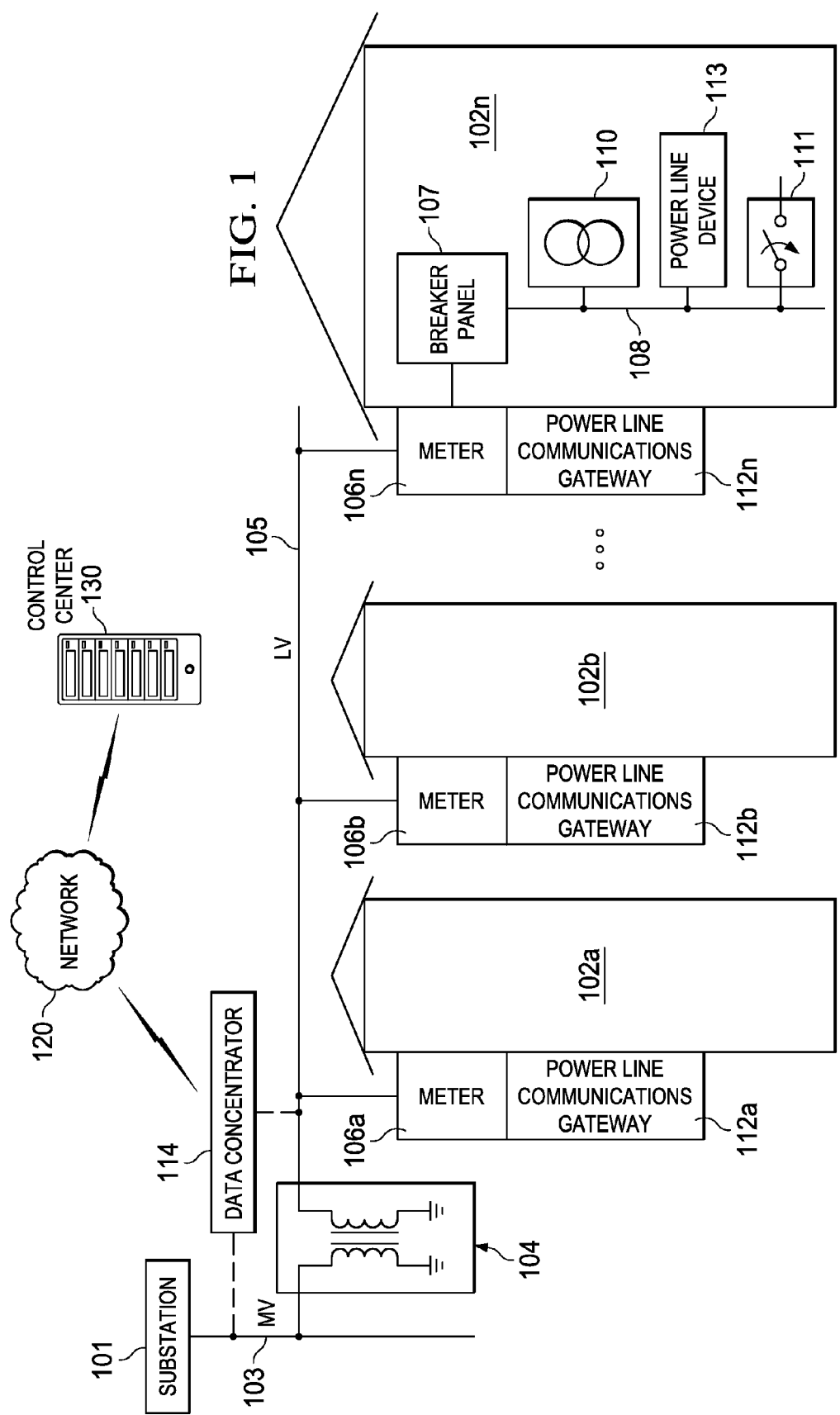

Having thus described the invention(s) in general terms, reference will now be made to the accompanying drawings, wherein:

FIG. 1 is a diagram of a PLC system according to some embodiments.

Figure 2:
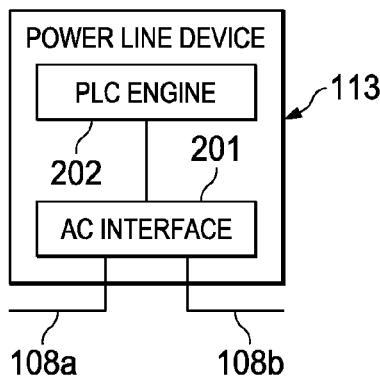

FIG. 2 is a block diagram of a PLC device or modem according to some embodiments.

Figure 3:
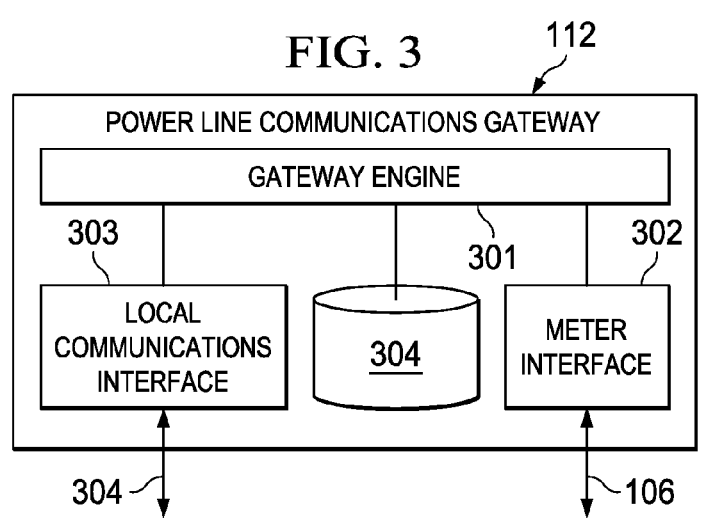

FIG. 3 is a block diagram of a PLC gateway according to some embodiments.

Figure 4:
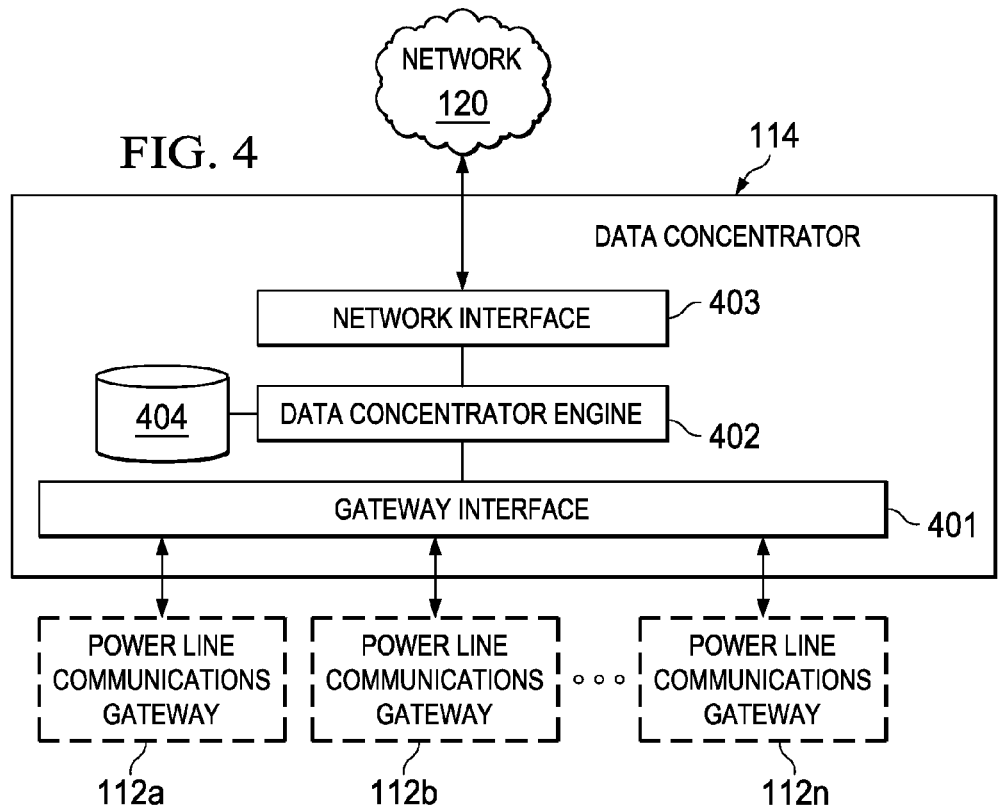

FIG. 4 is a block diagram of a PLC data concentrator according to some embodiments.

FIG. 5 illustrates a transmit-receive pair according to one embodiment.

FIG. 6 illustrates seventy-two individual tones that are present in a G3-FCC band.

FIG. 7 illustrates the results of a simulation that compared the performance of dummy bit transmission versus nulling for both thirty-six-tone and eighteen-tone cases for a fixed time domain transmit power level.

Figure 8:
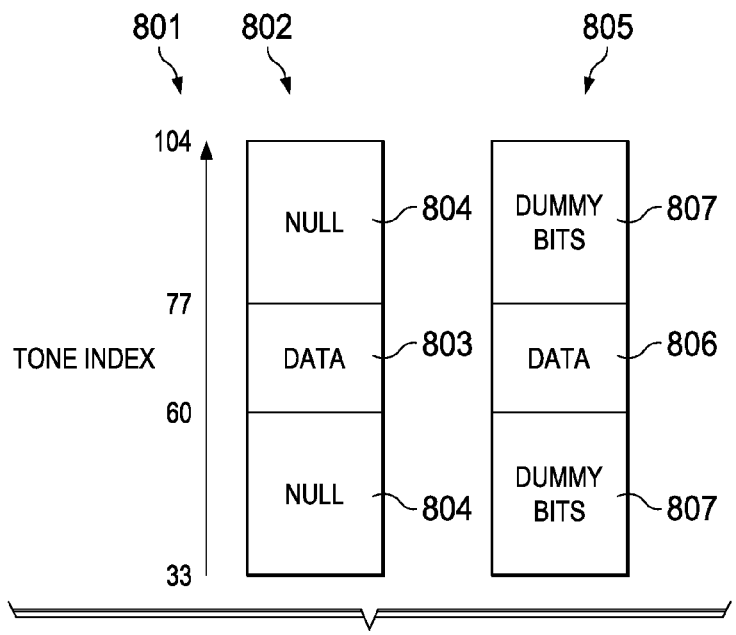

FIG. 8 is a pictorial representation of transmissions using dummy bits and null bits.

Figure 9:
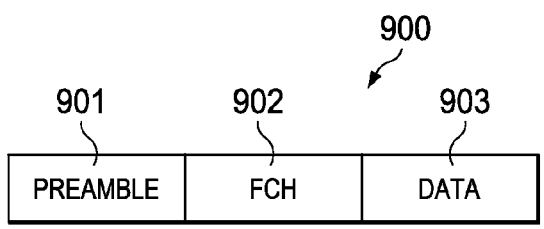

FIG. 9 illustrates a frame transmitted between nodes according to one embodiment.

Figure 10:
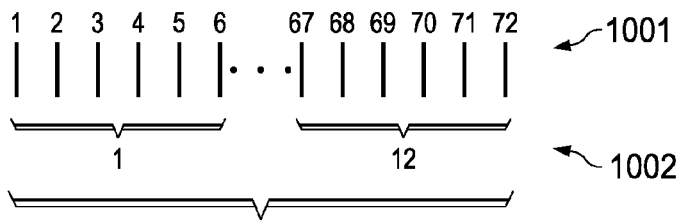

FIG. 10 illustrates the grouping of six tones in the G3-FCC band into FCH table sub-bands 1002.

Figure 11:
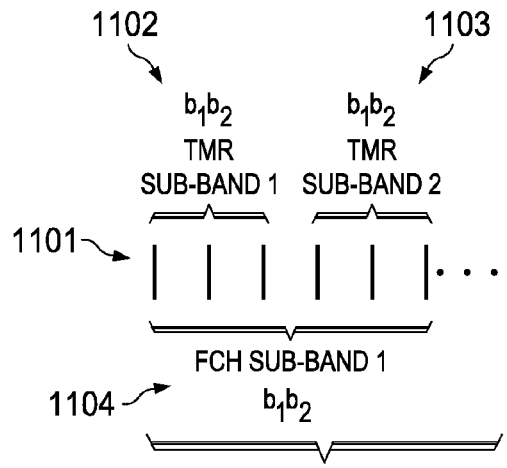

FIG. 11 illustrates how the same tones are treated differently in the TMR table and the FCH table.

Figure 12:
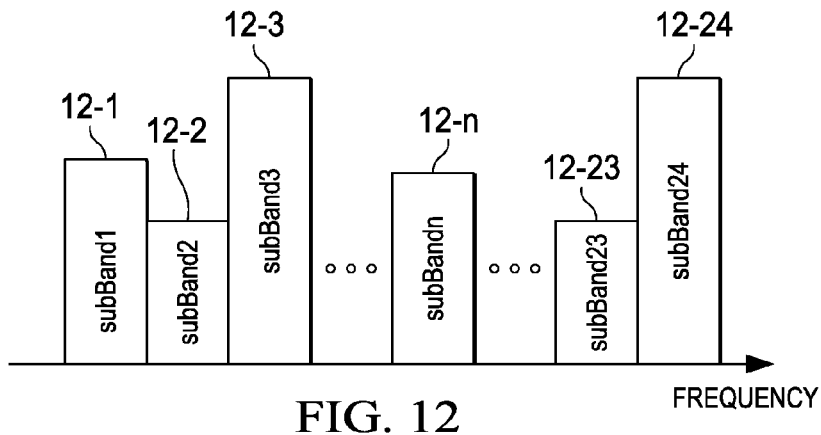

FIG. 12 illustrates the relative transmit power levels in different sub-bands for an OFD signal at the transmitter side.

Figure 13:
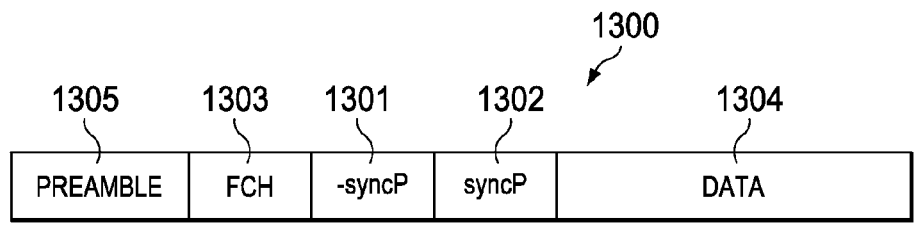

FIG. 13 illustrates a frame structure in which two syncP symbols are placed after FCH and before the data payload signal at the transmitter side.

Figure 14:
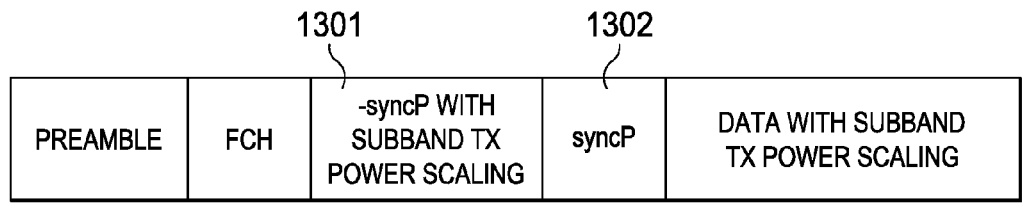

FIG. 14 illustrates a −syncP symbol that has been scaled by the transmit node, where a syncP symbol is not scaled.

Figure 15:
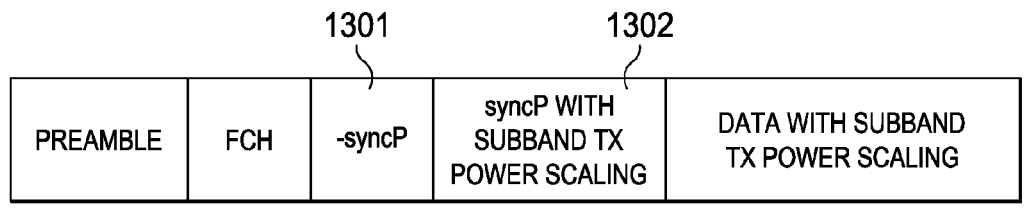

FIG. 15 illustrates a −syncP symbol that is not scaled, where a syncP symbol is scaled by the transmit node.

Figure 16:
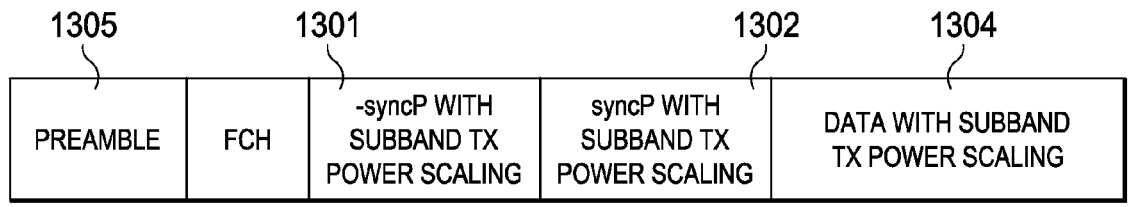

FIG. 16 illustrates scaling of both −syncP and syncP symbols.

Figure 17:
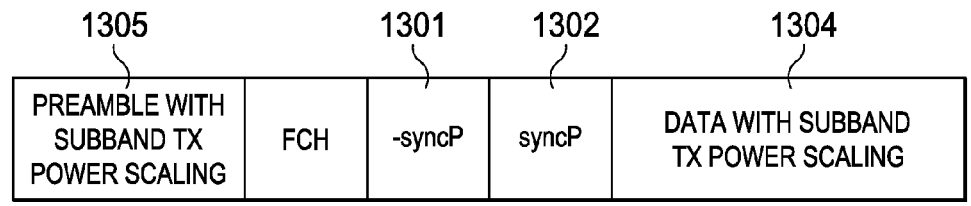

FIG. 17 illustrates not scaling the syncP symbols, but instead scaling a preamble.

Figure 18:
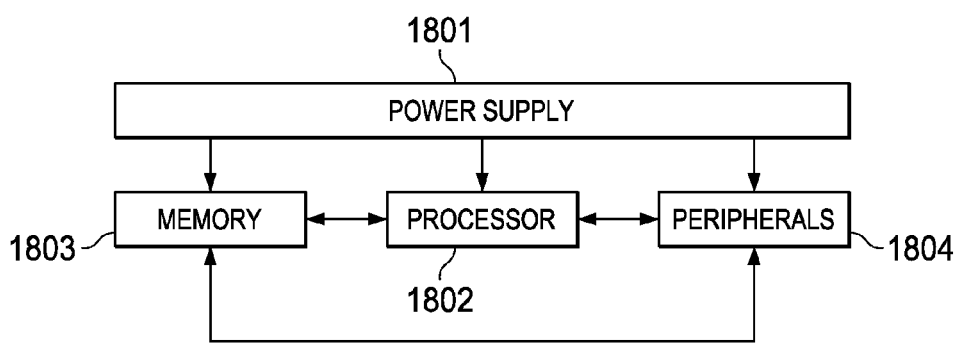

FIG. 18 is a block diagram of an integrated circuit according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

FIG. 1 illustrates a power line communication (PLC) system according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, electric vehicle charging station, or other location where electric power is received and/or consumed. A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, by the PRIME, G3 or IEEE 1901 standards.

PLC modems or gateways 112a-n at residences 102a-n use the MV/LV power grid to carry data signals to and from PLC data concentrator or router 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

FIG. 5 illustrates a transmit-receive pair comprising Node 501 and Node 502. Nodes 501 and 502 may be PLC nodes, for example, that communicate using a G3-FCC band on a power line network 503. For purposes of simplifying the following description, node 501 is referred to the transmit node and node 502 is referred to a receive node; however, it will be understood that both nodes 501 and 502 are transceivers that are capable of both transmit and receive operations. Upon an initial connection between nodes 501 and 502, transmit node 501 transmits data on all seventy-two tones within the assigned band (e.g., the G3-FCC band). Receive node 502 receives the data and evaluates or estimates the channel characteristics for each one on the communication medium. Receive node 502 then sends channel information to transmit node 501 in the form of Tone Map Response (TMR) table that indicates which sub-bands are good or bad. Transmit node 501 may then use the data in the TMR table to select which sub-bands to use for future transmissions to receive node 502. The use of the TMR table data is an optional recommendation for transmit node 501. So the transmit node 501 may or may not use the sub-band and channel information provided by the receive node 502 in the TMR table.

FIG. 6 illustrates seventy-two individual tones 601 that are present in a G3-FCC band. These individual tones 601 may be grouped together and combined into sub-bands. For example, if the seventy-two individual tones 601 are taken in groups of three, then the G3-FCC band may be divided into twenty-four sub-bands 602 (i.e., 72 tones/3=24 sub-bands). In the G3-FCC band, the seventy-two tones that are used may actually correspond to tone numbers 33-104 within the entire FCC band. In other frequency bands, the sub-bands may comprise a different number of tones. For example, for operations in a CENELEC band, the sub-bands may comprise six tones each.

In the IEEE P1901.2 standard, a tone map response (TMR) payload consisting of eighty bits enables a transmit-receive pair (e.g., nodes 501/502) to exchange information that identifies which tones 601 have good signal-to-noise ratio (SNR) and provides preferred communication parameters for these tones.

Table 1 illustrates an example TMR payload. A brief description of the fields is given as follows.

TXRES (1 bit) controls the gain resolution for one step. In one embodiment, if the TXRES bit is set to 1, then the gain resolution is 6 dB, and if the bit is set to 0, then the gain resolution if 3 dB.

TXGAIN (4 bits) specifies the number gain steps that are requested on all active sub-bands.

MOD (3 bits) specifies the modulation type. In one embodiment, the three MOD bits are set to represent the following modulation types:

000: ROBO
001: DBPSK/BPSK
010: DQPSK/QPSK
011: D8PSK/8PSK
100: 16 QAM
101 to 111: reserved LQI (8 bits) is a Link Quality Indicator that characterizes the quality of the channel estimates.

TMTXCOEFF (32 bits) specifies whether or not a sub-band should be used for communication. Each sub-band (602) comprises three tones (601). If a sub-band is not used, then the transmit node 501 then may either transmit dummy bits in that sub-band instead of data or it may not transmit anything at all. The TMTXCOEFF field further specifies the transmit gain in a sub-band.

TABLE 1

| TONE MAP RESPONSE (TMR) PAYLOAD | | | | |
| --- | --- | --- | --- | --- |
| FIELD | OCTET | BIT NUMBER | BITS | DEFINITION |
| TXRES | 0 | 7 | 1 | Transmit gain resolution corresponding to one gain step |
| TXGAIN | | 6-3 | 4 | Desired Transmitter gain specifying how many gain steps are requested on all active sub-bands |
| MOD | | 2-0 | 3 | Modulation type |
| LQI | 1 | 7-0 | 8 | Link Quality Indicator |
| TMTXCOEF[1:0] | 2 | 7-6 | 2 | Specifies power control for sub-band 1 |
| TMTXCOEF[3:2] | | 5-4 | 2 | Specifies power control for sub-band 2 |
| TMTXCOEF[5:4] | | 3-2 | 2 | Specifies power control for sub-band 3 |
| TMTXCOEF[7:6] | | 1-0 | 2 | Specifies power control for sub-band 4 |
| TMTXCOEF[9:8] | 3 | 7-6 | 2 | Specifies power control for sub-band 5 |
| TMTXCOEF[11:10] | | 5-4 | 2 | Specifies power control for sub-band 6 |
| TMTXCOEF[13:12] | | 3-2 | 2 | Specifies power control for sub-band 7 |
| TMTXCOEF[15:14] | | 1-0 | 2 | Specifies power control for sub-band 8 |
| TMTXCOEF[17:16] | 4 | 7-6 | 2 | Specifies power control for sub-band 9 |

TABLE 1-continued

TONE MAP RESPONSE (TMR) PAYLOAD

| FIELD | OCTET | BIT NUMBER | BITS | DEFINITION |
|---|---|---|---|---|
| TMTXCOEF[19:18] | | 5-4 | 2 | Specifies power control for sub-band 10 |
| TMTXCOEF[21:20] | | 3-2 | 2 | Specifies power control for sub-band 11 |
| TMTXCOEF[23:22] | | 1-0 | 2 | Specifies power control for sub-band 12 |
| TMTXCOEF[25:24] | 5 | 7-6 | 2 | Specifies power control for sub-band 13 |
| TMTXCOEF[27:26] | | 5-4 | 2 | Specifies power control for sub-band 14 |
| TMTXCOEF[29:28] | | 3-2 | 2 | Specifies power control for sub-band 15 |
| TMTXCOEF[31:30] | | 1-0 | 2 | Specifies power control for sub-band 16 |
| TMTXCOEF[33:32] | 6 | 7-6 | 2 | Specifies power control for sub-band 17 |
| TMTXCOEF[35:34] | | 5-4 | 2 | Specifies power control for sub-band 18 |
| TMTXCOEF[37:36] | | 3-2 | 2 | Specifies power control for sub-band 19 |
| TMTXCOEF[39:38] | | 1-0 | 2 | Specifies power control for sub-band 20 |
| TMTXCOEF[41:40] | 7 | 7-6 | 2 | Specifies power control for sub-band 21 |
| TMTXCOEF[43:42] | | 5-4 | 2 | Specifies power control for sub-band 22 |
| TMTXCOEF[45:44] | | 3-2 | 2 | Specifies power control for sub-band 23 |
| TMTXCOEF[47:46] | | 1-0 | 2 | Specifies power control for sub-band 24 |
| ONOFFMODE | 8 | 7 | 1 | Specifies whether inactive sub-bands shall be turned ON or OFF |
| Coherent Mode Capable | 8 | 6 | 1 | Coherent mode support indication |
| (Reserved) | 8 | 5-0 | 6 | Reserved |
| (Reserved) | 9 | | 8 | Reserved |

Sub-bands that are not used may either transmit dummy bits or not transmit or may not transmit anything on them. This choice is made using the ONOFFMODE bit where a 0 indicates no energy transmitted and a 1 indicates dummy bits are transmitted. Transmission of dummy bits in unused sub-bands is wasteful given a fixed or target average output power (or rms voltage). It is better to redistribute the power to the good sub-bands. This is analogous to what is done in water-filling (an optimal power control strategy) whereby more power is allocated to good sub-bands.

As mentioned above, not transmitting in a sub-band or nulling an unused sub-band is better than wasting power by transmitting dummy bits in that sub-band. FIG. 7 illustrates the results of a simulation that compared the performance of dummy bit transmission versus nulling for both thirty-six-tone and eighteen-tone cases for a fixed time domain transmit power level. Curve 701 represents the results for transmission on the full seventy-two tone FCC sub-band (i.e., tones 33-104), and curves 702 and 703 represent the transmission of dummy bits on the center thirty-six (i.e., tones 51-86) and center eighteen tones (i.e., tones 60-77), respectively, within the seventy-two-tone FCC band. Curve 704 represents a transmission with nulling for the center thirty-six tones within the seventy-two-tone FCC band. Curve 705 represents a transmission with nulling for the center eighteen tones within the seventy-two-tone FCC band.

FIG. 8 is a pictorial representation of the transmissions for curves 701 and 703. The seventy-two-tone FCC band represents tones numbered 33-104 (801). Null tone method 802 transmits data in the center eighteen tones 803 and nulls the remaining tones 804. Dummy tone method 805 transmits data in the center eighteen tones 806 and dummy bits the remaining tones 807.

In FIG. 7, it can be seen that a 3-dB gain is observed when going from seventy-two tones (701) to thirty-six tones (704) with the nulling scheme as compared to the dummy bit transmission scheme (702). An additional 3-dB is gained when going from thirty-six tones (704) to eighteen tones (705). Note that even though this example is for AWGN, it clearly illustrates that transmitting dummy bits is less than optimal. For the case of frequency selective channels, it has been shown that waterfilling or transmitting power in good tones is the optimal capacity achieving energy distribution. Waterfilling is also used in ADSL (another OFDM on the line communication system).

Note that with TM and TXCOEFF combined, both G3-FCC and FCC-low can be simultaneously supported in the TMR table. G3-FCC has twenty-four sub-bands while FCC-low has seven sub-bands, where each sub-band has three tones. Hence, if two bits are allocated per sub-band, both G3-FCC and FCC-low can be easily represented in the same TMR (i.e., (24 G3-FCC bands+7 FCC-low bands)×2 bits=62 bits).

FIG. 9 illustrates a frame 900 transmitted between nodes according to one embodiment. Frame 900 comprises a preamble 901, Frame Control Header (FCH) 902, and payload data 903. FCH 902 is seventy-two bits long and contains information regarding the current frame, such as the type of frame, the tone map index of the frame, the length of the frame, etc. Although the tone map in FCH 902 tells the receiving node what sub-bands are being used, frame 900 does not tell the receiving node what the gain values, if any, have been applied. The receiving node may not operate properly if it does not know what boosting has been applied by the transmitting node.

The receiver needs to know the gains applied on a sub-band basis at the transmitter. This is especially important for 16 QAM where the decision regions are dependent on the gain. In cases where unitary constellations are used (e.g., BPSK, QPSK or 8PSK), knowledge of sub-band gains can be used to get improved noise variance estimates. Hence it is important for the FCH table to contain sub-band gain information.

The FCH table has a total of seventy-two bits of which thirty-two are allocated for tone map and sub-band power control. Table 2 illustrates some of the possibilities for bit allocation in order to choose the sub-bands and for power control.

TABLE 2

| OPTION | NUMBER OF TONES PER SUB-BAND (BANDWIDTH) | NUMBER OF BITS PER SUB-BAND | TOTAL NUMBER BITS REQUIRED | COMMENTS |
|---|---|---|---|---|
| 1 | 3-tones (14 kHz) | 1 | 24 × 1 = 24 | Does not allow for sub-band power control. Only tells which sub-band is used |
| 2 | 3-tones (14 kHz) | 2 | 24 × 2 = 48 | Requires 16 extra bits to be added to FCH |

TABLE 2-continued

| OPTION | NUMBER OF TONES PER SUB-BAND (BANDWIDTH) | NUMBER OF BITS PER SUB-BAND | TOTAL NUMBER BITS REQUIRED | COMMENTS |
|---|---|---|---|---|
| 3 | 6-tones (28 kHz) | 2 | 12 × 2 = 24 | Fits into current FCH without addition of extra bits and provides power control |
| 4 | 9-tones (42 kHz) | 4 | 8 × 4 = 32 | Sub-band size is large and the fine bit resolution is excessive for power control. |

As observed, Option 3 allows for the best trade-off between (a) the number of power control levels, (b) sub-band size, and (c) number of bits required in the FCH. A further advantage is that eight extra bits are saved which allows them to be used for other purposes. The two TMTX-COEF bits indicate one of two types of information:

a) either dummy data or no data is being transmitted. (The ONOFFMODE bit described below may be used to decide between the two options).

b) when data is transmitted, the bits indicate what gain has been used in that sub-band.

In one embodiment, four possible options are enumerated by two TMTXCOEF bits are used to specify the power control for each sub-band.

In a first example configuration, the TMTXCOEF power control bits may be set as follows:

00: either dummy data or no data is transmitted on this subband,
01: data transmitted on this sub-band is scaled by a value −X dB,
10: data transmitted on this sub-band is scaled by a value X dB,
11: data transmitted on this sub-band and is not scaled.

In a second example configuration, the TMTXCOEF power control bits may be set as follows:

00: either dummy data or no data is transmitted on this subband,
01: data transmitted on this sub-band is scaled by a value X dB,
10: data transmitted on this sub-band is scaled by a value 2X dB,
11: data transmitted on this sub-band and is not scaled.

The TMTXCOEFF bits are used in connection with the TXRES bit, which specifies a gain resolution (i.e., x=gain specified by TXRES).

ONOFFMODE Bit

If the TMTXCOEF bits are set to 00 for a given sub-band, this implies that either dummy data or no data is transmitted in that sub-band (i.e., no data on that sub-band). The ONOFFMODE bit can be used to indicate the state of the unused sub-band.

0: indicates that all in-active sub-bands should be turned OFF (i.e., no energy is transmitted on them)
1: indicates that all in-active sub-bands should be turned ON and have dummy bits transmitted on them.

TXRES Bit

The TXRES bit specifies the power scaling factor (X) for TMTXCOEF options 01 and 10. In one embodiment, if the TXRES bit is set to 1, then the gain resolution is 6 dB, and if the bit is set to 0, then the gain resolution if 3 dB.

In the first example configuration above, if TXRES is 0, then X=3 dB, and
for TMTXCOEF (01) the scaling is 3 dB,
for TMTXCOEF (10) the scaling is −3 dB; and
if TXRES is 1, then X=6 dB, and
for TMTXCOEF (01) the scaling is 6 dB,
for TMTXCOEF (10) the scaling is −6 dB.

In the second example configuration above, if TXRES is 0, then X=3 dB, and
for TMTXCOEF (01) the scaling is 3 dB,
for TMTXCOEF (10) the scaling is 6 dB (i.e., 2X); and
if TXRES is 1, then X=6 dB, and
for TMTXCOEF (01) the scaling is 6 dB,
for TMTXCOEF (10) the scaling is 12 dB.

Table 3 is a proposed FCH table.

TABLE 3

| FIELD | OCTET | BIT NUMBER | BITS | DEFINITION |
|---|---|---|---|---|
| PDC | 0 | 7 to 0 | 8 | Phase detection counter |
| MOD | 1 | 7 to 5 | 3 | Modulation type |
| Coherent Mode | | 4 | 1 | Differential/Coherent Mode |
| DT | | 3 to 1 | 3 | Delimiter type: |
| FL | | 0 | 9 | PHY frame length in PHY symbols |
| | 2 | 7 to 0 | | |
| TMTXCOEF[1:0] | 3 | 7-6 | 2 | Specifies power control for sub-band 1. |
| TMTXCOEF[3:2] | 3 | 5-4 | 2 | Specifies power control for sub-band 2 |
| TMTXCOEF[5:4] | 3 | 3-2 | 2 | Specifies power control for sub-band 3 |
| TMTXCOEF[7:6] | 3 | 1-0 | 2 | Specifies power control for sub-band 4 |
| TMTXCOEF[1:0] | 4 | 7-6 | 2 | Specifies power control for sub-band 5 |
| TMTXCOEF[3:2] | 4 | 5-4 | 2 | Specifies power control for sub-band 6 |
| TMTXCOEF[5:4] | 4 | 3-2 | 2 | Specifies power control for sub-band 7 |
| TMTXCOEF[7:6] | 4 | 1-0 | 2 | Specifies power control for sub-band 8 |
| TMTXCOEF[1:0] | 5 | 7-6 | 2 | Specifies power control for sub-band 9 |
| TMTXCOEF[3:2] | 5 | 5-4 | 2 | Specifies power control for sub-band 10 |
| TMTXCOEF[5:4] | 5 | 3-2 | 2 | Specifies power control for sub-band 11 |
| TMTXCOEF[7:6] | 5 | 1-0 | 2 | Specifies power control for sub-band 12 |
| DTM | 6 | 7 | 1 | Data Tone Mask |
| CP Mode | 6 | 6 | 1 | CP Mode |
| TXRES | 6 | 5 | 1 | Gain value |
| ONOFFMODE | 6 | 4 | 1 | Specifies whether inactive sub-bands shall be turned ON or OFF. |
| Reserved | 6 | 3 to 0 | 7 | reserved |
| | 7 | 7 to 6 | | |
| ConvZeros | | 5 to 0 | 6 | Zeros for convolutional encoder |
| FCCS | 8 | 7 to 0 | 8 | Frame control check sequence (CRC8 or CRC5) |

The MOD field identifies the type of modulation used. In one embodiment, the three bits in the MOD field are configured as follows to identify the modulation type.

000: ROBO
001: DBPSK/BPSK
010: DQPSK/QPSK
011: D8PSK/8PSK
100: 16 QAM

101: Super ROBO
110-111: Reserved
The Coherent Mode bit identifies whether the modulation is coherent or differential using the following coding:
  0: Differential Mode
  1: Coherent Mode
The bits in the Delimiter Type (DT) field are set as follows:
  000: Start of frame with no response expected
  001: Start of frame with response expected
  010: Positive acknowledgment (ACK)
  011: Negative acknowledgment (NACK)
  100: Busy negative acknowledgment (BUSY_REJECT)
  101: Busy accept acknowledgement (BUSY_ACCEPT)
  110: NO_EARLIER_SEGMENTS
  111: Reserved The TMTXCOEF fields in FCH Table 3 correspond to six contiguous tones, instead of representing three tones as used in the TMR (Table 1). Given the seventy-two tones in the G3-FCC band, the band can be divided into twelve sub-bands if each sub-band has six tones (i.e., 72 tones/6 tones/sub-band=12 sub-bands). Two bits can be used to represent each sub-band in this configuration and still maintain a twenty-four bit space in the FCH table (12 sub-bands×2 bits/sub-band=24 bits).

The bit in the Data Tone Mask (DTM) field is set as follows:
  0: This is the default value for the non multi-tone mask mode. For multi-tone mask mode, this value indicates that the data tone mask is same as preamble/header
  1: Data Tone Mask for either the FCC above CENELEC or FCC above CENELEC plus the CENELEC band.

As indicated above, the bit in the TXRES field is set as follows:
  0: +/−6 dB gain for TMTXCOEF values 01/10,
  1: +/−3 dB gain for TMTXCOEF values 01/10.

The ONOFFMODE field specifies whether inactive sub-bands shall be turned ON or OFF. When a receiving node communicates in the TMR table that a transmit node should not use certain sub-bands, the transmit node may insert dummy bits on the tones for the unused sub-bands. However, the transmission of such dummy bits wastes energy that is better used for tones carrying actual data bits. The ONOFFMODE field allows the transmit node to notify the receiving node if dummy bits have been used or if nothing was transmitted in unused sub-bands.

The ONOFFMODE bit is set as follows:
  0: indicates that all inactive sub-bands shall be turned OFF (no energy is transmitted on them)
  1: indicates that all inactive sub-bands shall be turned ON and have dummy bits transmitted on them.

Note that an inactive sub-band is a sub-band where no payload data is transmitted (i.e., its TMTXCOEF value=00).

The FCH table format proposed in Table 3 allows the transmitting node to provide transmit power information per sub-band to the receiving node, where each sub-band in the FCH table represents six tones. However, the TMR table that is sent by the receiving node users sub-bands having three tones. As a result, two TMR sub-bands correspond to one FCH table sub-bands.

FIG. 10 illustrates how groups of six tones 1001 in the G3-FCC band, for example, are combined into FCH table sub-bands 1002.

FIG. 11 illustrates how the same six tones are treated differently in the TMR table and the FCH table. On the receive node side, tones 1-3 correspond to TMR sub-band 1, and tones 4-6 correspond to TMR sub-band 2. Two sets of TMR TMTXCOEF bits ($b_1 b_2$) 1102, 1103 are used to specify the power control for each of these TMR sub-bands. On the transmit node side, tones 1-6 correspond to a single FCH sub-band 1. Once set of FCH TMTXCOEF bits ($b_1 b_2$) 1104 is used to specify the power control for all six tones in this FCH sub-band.

It is apparent from FIG. 11 that a conflict may result if, for example, the receiving node sends a TMR table that specifies boosting TMR sub-band 1 in bits 1102 and specifies decreasing TMR sub-band 2 in bits 1103. The FCH table used by the transmit node is unable to indicate such a split within the six-tone FCH sub-band. Accordingly, FCH bits 1104 must specify the power control for all six tones in the FCH sub-band.

TABLE 4

| TMR TABLE TMTXCOEF VALUES | FCH TABLE TMTXCOEF VALUE |
|---|---|
| if either TMR sub-band is specified as do not use | do not use any of tones in the corresponding FCH sub-band |
| if either or both TMR sub-bands specify increasing power | increase the power on all tones in the corresponding FCH sub-band |
| if one TMR sub-band specifies decreasing power, and the other TMR sub-band specifies keeping the power the same (i.e., no power scaling) | all of the tones in the corresponding FCH sub-band are kept the same (i.e., no power scaling) |
| if both TMR sub-bands specify decreasing power | decrease the power on the corresponding FCH sub-band |

As shown in Table 4, the emphasis is toward increasing power where indicated in the TMR table from the receiving node.

It is important for the transmitting node to notify the receiving node when it is boosting power on a sub-band. Knowing when power scaling occurs on a sub-band is relevant to decoding of non-unitary modulation, such as 16 QAM. However, boosting is not as critical for differential or unitary modulation. Knowledge of sub-band transmit power scaling is helpful to improve noise variance estimation.

Table 5 is an FCH table that may be used with differential modulation. The bit definitions correspond to the similarly named fields described above.

TABLE 5

| FIELD | OCTET | BIT NUMBER | BITS | DEFINITION |
|---|---|---|---|---|
| PDC | 0 | 7 to 0 | 8 | Phase detection counter |
| MOD | 1 | 7 to 5 | 3 | Modulation type: |
| Coherent Mode | | 4 | 1 | Differential/Coherent Mode |
| DT | | 3 to 1 | 3 | Delimiter type |
| FL | | 0 | 9 | PHY frame length in PHY symbols |
| | 2 | 7 to 0 | | |
| TM[7:0] | 3 | 7 to 0 | 8 | TM[7:0]: Tone Map |
| TM[15:8] | 4 | 7 to 0 | 8 | TM[15:8]: Tone Map |
| TM[23:16] | 5 | 7 to 0 | 8 | TM[23:16]: Tone Map |
| DTM | 6 | 7 | 1 | Data Tone Mask |
| CP Mode | 6 | 6 | 1 | CP Mode |
| Reserved | 6 | 5 to 0 | 8 | reserved |
| | 7 | 7 to 6 | | |
| ConvZeros | | 5 to 0 | 6 | Zeros for convolutional encoder |
| FCCS | 8 | 7 to 0 | 8 | Frame control check sequence (CRC8 or CRC5) |

In some embodiments, a pair of transmit-receive nodes may select which FCH table to use based upon the type of modulation used. One type of FCH table is a default table that uses one bit to represent a three-tone sub-band, such as Table 5. The other type of FCH table uses two bits to represent a six-tone sub-band, such as Table 3.

In a first option, the nodes will use a default FCH table (Table 5) when differential modulation is being used. However, when coherent modulation is being used, then the nodes will use the modified FCH table (Table 3 or a similar table) that uses two bits to represent a six-tone sub-band.

In a second option, the nodes will use a default FCH table (Table 5) when differential modulation or unitary coherent modulation is being used. However, when coherent 16 QAM modulation is used, then the nodes will use the modified FCH table (Table 3 or a similar table) that uses two bits to represent a six-tone sub-band.

In a third option, the nodes will use the modified FCH table (Table 3 or a similar table) for all modulation types. In this option, the nodes always use two bits to represent a six-tone sub-band in the FCH table.

In a fourth option, the nodes will always use the default FCH table (Table 5) and scaling will be performed when 16 QAM modulation is used.

In a fifth option, the nodes will always use the default FCH table (Table 5) and no scaling will allowed for any modulation types.

Sub-Band Transmit Power Estimation Using Preamble

FIG. 12 illustrates the relative transmit power levels in different sub-bands 12-01 to 12-24 for an OFDM signal at the transmitter side. This scaling may be performed in response to channel information in a TMR table, for example; however, the transmitting node does not have to follow the power specifications in the TMR table.

The transmit power level in each sub-band needs to be accounted for at the receiver. If the transmitting node does not specify how it has scaled the sub-bands, then the receiver must estimate the transmit power scaling factor in each sub-band—i.e., the receiver must estimate if the sub-band power has been scaled and, if so, by how much.

Coherent modulation offers one way to obtain better performance in a PLC network. FIG. 13 illustrates a frame structure 1300 in which two syncP symbols 1301, 1302 are placed after FCH 1303 and before the data payload 1304. The syncP symbols 1301, 1302 may be used to assist with channel estimation in coherent modulation. It will be understood that the inverse syncP symbol (–syncP) 1301 may also be referred to as a syncM symbol. In other contexts, –syncP (syncM) may be identified as "s1", and syncP may be identified as "s2".

The preamble 1305 typically comprises a series of syncP and syncM symbols. In one embodiment, preamble 1305 comprises eight syncP symbols followed by one and half syncM symbols. The preamble 1305 and FCH 1303 are not scaled by the transmit node. Only the data bits 1304 are scaled in current embodiments. However, if the –syncP and syncP symbols 1301, 1302 are also scaled, then the sub-band transmit power levels can be estimated by comparing the scaled –syncP and syncP symbols 1301, 1302 to each other or to the –syncP and syncP symbols in the preamble 1305. FIGS. 14-17 illustrate different combinations of –syncP and syncP scaling that can be used to estimate sub-band power levels.

In FIG. 14, the –syncP symbol 1301 has been scaled by the transmit node, but the syncP symbol 1302 is not scaled. In FIG. 15, the opposite scaling is used so that the –syncP 1301 is not scaled, but the syncP symbol 1302 is scaled by the transmit node. In the examples of FIGS. 14 and 15, the transmit power scaling factor in each sub-band may be obtained at the receiver by comparing the channel estimates in each sub-band from the two syncP symbols 1301, 1302 to each other.

In FIG. 16, both syncP symbols 1301, 1302 are scaled. For example, both syncP symbols 1301, 1302 may have the same sub-band transmit power scaling as the data 1304. The preamble 1305 is not scaled, so the channel estimates from syncP symbols 1301, 1302 may be combined and compared with channel estimates from the preamble 1305 to determine scaling in each sub-band.

In FIG. 17, neither syncP symbol 1301, 1302 is scaled; however, the preamble 1305 is scaled. For example, preamble 1305 may have the same sub-band transmit power scaling as the data 1304. Again, the channel estimates from syncP symbols 1301, 1302 may be combined and compared with channel estimates from the scaled preamble 1305 to determine scaling in each sub-band.

The sub-band power scaling estimates determined from the formats illustrated in FIGS. 14-17 can be used to by the receiver when demodulating the data 1304.

FIG. 18 is a block diagram of a circuit for implementing PLC communications and channel estimation according to some embodiments. In some cases, one or more of the devices and/or apparatuses shown in FIGS. 1-4 may be implemented as shown in FIG. 18. In some embodiments, processor 1802 may be a digital signal processor (DSP), an application specific integrated circuit (ASIC), a system-on-chip (SoC) circuit, a field-programmable gate array (FPGA), a microprocessor, a microcontroller, or the like. Processor 1802 is coupled to one or more peripherals 1804 and external memory 1803. In some cases, external memory 1803 may be used to store and/or maintain databases 304 and/or 404 shown in FIGS. 3 and 4. Further, processor 1802 may include a driver for communicating signals to external memory 1803 and another driver for communicating signals to peripherals 1804. Power supply 1801 provides supply voltages to processor 02 as well as one or more supply voltages to memory 1803 and/or peripherals 1804. In some embodiments, more than one instance of processor 1802 may be included (and more than one external memory 1803 may be included as well).

Peripherals 1804 may include any desired circuitry, depending on the type of PLC system. For example, in an embodiment, peripherals 1804 may implement local communication interface 303 and include devices for various types of wireless communication, such as WI-FI, ZIGBEE, BLUETOOTH, cellular, global positioning system, etc. Peripherals 1804 may also include additional storage, including RAM storage, solid-state storage, or disk storage. In some cases, peripherals 1804 may include user interface devices such as a display screen, including touch display screens or multi-touch display screens, keyboard or other input devices, microphones, speakers, etc.

External memory 1803 may include any type of memory. For example, external memory 1803 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 1803 may include one or more memory modules to which the memory devices are mounted, such as single inline memory modules (SIMMs), dual inline memory modules (DIMMs), etc.

It will be understood that in various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method for implementing sub-band power control in a power line communications (PLC) device, comprising:
   selecting one or more transmit sub-bands on which to transmit a frame to comprise instructions for a processor in the PLC device, the transmit sub-bands comprising groups of the carrier frequencies;
   generating the frame comprising:
   a tone map that indicates which transmit sub-bands are used to carry data for the frame, the tone map using two bits per transmit sub-band to indicate a status of each transmit sub-band;
   a resolution bit indicating an amount of power adjustment that has been applied to the carrier frequencies in the transmit sub-bands; and
   a mode bit indicating whether dummy bits are transmitted on carrier frequencies in the transmit sub-bands that do not carry data; and
   transmitting the frame on the selected transmit sub-bands.

2. The method of claim 1, wherein the transmit sub-bands comprise groups of three carrier frequencies.

3. The method of claim 1, wherein the transmit sub-bands comprise groups of six carrier frequencies.

4. The method of claim 1, wherein a number of carrier frequencies is seventy-two.

5. The method of claim 4, wherein a number of transmit sub-bands is twelve, and the tone map comprises twenty-four bits.

6. The method of claim 1, further comprising:
   setting the two bits per transmit sub-band to indicate that a transmit sub-band has been used to carry data and that the power in the transmit sub-band has been adjusted.

7. The method of claim 1, further comprising:
   setting the two bits per transmit sub-band to indicate that a transmit sub-band has been used to carry data and that the power in the transmit sub-band has not been adjusted.

8. The method of claim 1, further comprising:
   setting the two bits per transmit sub-band to indicate that a transmit sub-band has not been used to carry data.

9. The method of claim 1, wherein the two bits per transmit sub-band, the resolution bit, and the mode bit are grouped within a frame control header segment of the frame.

10. The method of claim 1, wherein a frame control header table comprising a tone map that uses two bits per transmit sub-band to indicate a status of each transmit sub-band is used only when coherent modulation is used for transmitting the frame, and otherwise using a frame control header table comprising a tone map that uses one bit per transmit sub-band.

11. The method of claim 1, wherein a frame control header table comprising a tone map that uses two bits per transmit sub-band to indicate a status of each transmit sub-band is used only when coherent 16 QAM modulation is used for transmitting the frame, and otherwise using a frame control header table comprising a tone map that uses one bit per transmit sub-band.

12. The method of claim 1, wherein the two bits per transmit sub-band are a TMTXCOEF field.

13. The method of claim 1, wherein the mode bit is an ONOFFMODE field.

14. The method of claim 12, wherein the TMTXCOEF field may be set as follows;
   00: either dummy data or no data is transmitted on this sub-band,
   01: data transmitted on this sub-band is scaled by a value −X dB,
   10: data transmitted on this sub-band is scaled by a value X dB,
   11: data transmitted on this sub-band and is not scaled.

15. The method of claim 12, wherein the TMTXCOEF field may be set as follows:
   00: either dummy data or no data is transmuted on this sub-band,
   01: data transmitted on this sub-band is scaled by a value X dB,
   10: data transmitted on this sub-band is scaled by a value 2X dB,
   11: data transmitted on this sub-band and is not scaled.

16. A method comprising:
   selecting one or more transmit sub-bands on which to transmit a frame to comprise instructions for a processor, the transmit sub-bands comprising groups of the carrier frequencies;
   generating the frame comprising:
   a tone map that indicates which transmit sub-bands are used to carry data for the frame, the tone map using two bits per transmit sub-band to indicate a status of each transmit sub-band;

a resolution bit indicating an amount of power adjustment that has been applies to the carrier frequencies in the transmit sub-bands; and a mode bit indicating whether dummy bits are transmitted on carrier frequencies in the transmit sub-bands that do not carry data;

transmitting the frame on the selected transmit sub-bands;

receiving a tone response map from another device, the tone response map comprising status recommendations for receive sub-bands, wherein two consecutive receive sub-bands correspond to one transmit sub-band; and configuring a frame transmission on the transmit sub-bands based upon the status recommendations in the tone map.

17. The method of claim 16, wherein if a status recommendation for either receive sub-band indicates that the receive sub-band should not be used, then configuring the frame transmission to not use a corresponding transmit sub-band.

18. The method of claim 16, wherein if a status recommendation for either receive sub-band indicates that a power level for transmissions in the receive sub-band should be boosted, then configuring the frame transmission to boost a power level in a corresponding transmit sub-band.

19. The method of claim 16, wherein if a status recommendation for a first receive sub-band indicates that a power level for transmissions in the first receive sub-band should be decreased and a status recommendation for a second receive sub-band indicates that a power level for transmissions in the second receive sub-band should be maintained, then configuring the frame transmission to maintain a power level in a corresponding transmit sub-band.

20. A power line communication (PLC) device having sub-band power control, comprising:

a first processor; and a memory coupled to the processor, the memory configured to store program instructions executable by the first processor to cause the PLC device to:

select one or more transmit sub-bands on which to transmit a frame to comprise instructions for a second processor, the transmit sub-bands comprising groups of the carrier frequencies;

generate the frame comprising a tone map that indicates which transmit sub-bands are used to carry data for the frame, the tone map using two power control bits per transmit sub-band to specify a power control of each transmit sub-band, the frame further comprising a resolution bit and a mode bit, the resolution bit indicating an amount of power adjustment that has been applied to carrier frequencies in the transmit sub-bands, and the mode bit indicating whether dummy bits are transmitted on carrier frequencies in the transmit sub-bands that do not carry data; and transmit the frame on the selected transmit sub-bands.

21. The device of claim 20, wherein the transmit sub-bands comprise groups of three carrier frequencies.

22. The device of claim 20, wherein the transmit sub-bands comprise groups of six carrier frequencies.

23. The device of claim 20, wherein a number of carrier frequencies is seventy-two.

24. The device of claim 20, wherein the two bits per transmit sub-band is a TMTXCOEF field.

25. The device of claim 20, wherein the mode bit is an ONOFFMODE field.

26. The device of claim 24, wherein the TMTXCOEF field may be set as follows:
   00: either dummy data or no data is transmitted on this sub-band,
   01: data transmitted on this sub-band is scaled by a value −X dB,
   10: data transmitted on this sub-band is scaled by a value X dB,
   11: data transmitted on this sub-band and is not scaled.

27. The device of claim 24, wherein the TMTXCOEF field may be set as follows:
   00: either dummy data or no data is transmitted on this sub-band,
   01: data transmitted on this sub-band is sealed by a value X dB,
   10: data transmitted on this sub-band is scaled by a value 2X dB,
   11: data transmitted on this sub-band and is not scaled.

28. A non-transitory frame with instructions for a processor stored in a memory coupled to the processor for sub-band power control, the non-transitory frame comprising:

a tone map to indicate which transmit sub-bands are used to carry data for the frame, the tone map using two power control bits per transmit sub-band to specify a power control of each transmit sub-band;

a resolution bit to indicate an amount of power adjustment that has been applied to carrier frequencies in the transmit sub-bands; and a mode bit to indicate whether dummy bits are transmitted on carrier frequencies in the transmit sub-bands that do not carry data.

29. The frame of claim 28, wherein the two bits per transmit sub-band are a TMTXCOEF field.

30. The frame of claim 28, wherein the mode hit is an ONOFFMODE field.

* * * * *